United States Patent [19]
Jackson et al.

[11] Patent Number: 5,634,636
[45] Date of Patent: Jun. 3, 1997

[54] FLEXIBLE OBJECT HANDLING SYSTEM USING FEEDBACK CONTROLLED AIR JETS

[75] Inventors: Warren B. Jackson, San Francisco; David K. Biegelsen, Portola Valley; Lars-Erik Swartz, Sunnyvale; Andrew A. Berlin; Raj B. Apte, both of Palo Alto; Robert A. Sprague, Saratoga, all of Calif.

[73] Assignee: Xerox Corporation, Stamford, Conn.

[21] Appl. No.: 584,828

[22] Filed: Jan. 11, 1996

[51] Int. Cl.⁶ .................................. B65H 5/00; B65H 7/02
[52] U.S. Cl. .................... 271/225; 271/227; 271/265.02; 271/184; 271/195; 271/188; 406/87; 406/88; 406/12; 406/19
[58] Field of Search ...................... 271/188, 184, 271/185, 195, 225, 227, 265.01–265.03, 258.01, 259, 261–263; 406/86, 87, 88, 10, 12, 19

[56] References Cited

U.S. PATENT DOCUMENTS

| | | | |
|---|---|---|---|
| 3,243,181 | 3/1966 | Lyman | 271/195 X |
| 3,405,977 | 10/1968 | Albright | 271/195 X |
| 3,414,331 | 12/1968 | Fogg | 406/88 |
| 3,422,411 | 1/1969 | Smith, Jr. | 271/195 X |
| 3,437,335 | 4/1969 | Gluskin | 271/195 X |
| 3,550,964 | 12/1970 | Spyrofoulos | 406/19 |
| 3,918,706 | 11/1975 | Craft | 271/195 X |
| 4,577,854 | 3/1986 | Bachmann et al. | 271/227 |
| 4,618,292 | 10/1986 | Judge et al. | 406/87 X |
| 4,874,273 | 10/1989 | Tokisue et al. | 406/19 X |
| 5,497,987 | 3/1996 | Henn et al. | 406/88 X |

FOREIGN PATENT DOCUMENTS

| | | | |
|---|---|---|---|
| 214554 | 8/1989 | Japan | 271/227 |
| 243418 | 9/1990 | Japan | 406/19 |
| 2226538 | 7/1990 | United Kingdom | 271/195 |
| 2275903 | 9/1994 | United Kingdom | 406/19 |

OTHER PUBLICATIONS

Konishi, S. et al., A Conveyance System Using Air Flow Based on the Concept of Distributed Micro Motion Systems. Journal of Microelectromechanical Systems, vol. 3, No. 2, Jun. 1994, pp. 54–58.

Konishi, S. et al., System Design for Cooperative Control of Arrayed Microactuators. Proceedings of the IEEE Micro Electro Mechanical Systems 1995, IEEE, Piscataway, NJ, USA 95CH35754, pp. 322–327.

Paivanas, J.A. et al., Air Film System for Handling Semiconductor Wafers. IBM J. Res. Develop., vol. 23, No. 4, Jul. 1979, pp. 361–375.

*Primary Examiner*—Boris Milef
*Attorney, Agent, or Firm*—Robert A. Burtzlaff

[57] ABSTRACT

A fluid transport system for moving flexible objects includes a conveyor configured to direct fluid flow against opposite sides of flexible objects. A sensor unit senses motion state of flexible objects, and a motion analysis unit is connected to the sensor unit to calculate relative or absolute movement of flexible objects based on the motion state. Overall movement, position, velocity, and orientation of flexible objects can be determined, as well as internal movement of the object attributable to flexure or edge curling. A motion control unit is connected to the motion analysis unit to modify fluid flow directed against opposite sides of flexible objects, accurately adjusting motion of flexible objects.

6 Claims, 3 Drawing Sheets

5,634,636

FLEXIBLE OBJECT HANDLING SYSTEM USING FEEDBACK CONTROLLED AIR JETS

FIELD OF THE INVENTION

The present invention relates to air jet directed movement of flexible objects. More specifically, the present invention relates to feedback controlled movement of continuous or discrete flexible objects such as rolls or sheets of paper.

BACKGROUND AND SUMMARY OF THE INVENTION

A material processing system must often precisely control position and velocity of objects moving through the system. Commonly, material processing systems control object movement by physically engaging the object with a separate object drive mechanism that moves the object at a predetermined velocity along a predetermined path. For example, gear driven ratchets, rollers, hooks, or conveyors are widely employed to move objects as diverse as paper, semiconductors, plastics, or steel by mechanically engaging the objects, and moving the engaged objects along a desired path at a fixed velocity. While commonplace, mechanical or frictional engagement of objects does have a disadvantage of requiring direct physical contact with an object. For certain applications, including processing of high purity or delicate materials, contamination or damage to the object may result from mechanical grasping or contact. This is particularly true for high speed processing systems, which may damage objects simply by engaging them. For example, high speed rollers may damage paper through differential engagement of misaligned paper with the roller, resulting in ripping or tearing of the paper.

Fortunately, mechanical or frictional engagement is only one possible means for moving an object. Object drive mechanisms based on various fluid support techniques have long been employed to move delicate objects without requiring solid mechanical contact. For example, instead of using conventional belts, conveyors or rollers, paper moving through xerographic copier systems can be supported on a laminar air flow, or uplifted and moved by directed air jets. This form of fluid support is particularly advantageous, for example, when sheets of paper carrying unfixed toner images must be moved between a photoconductive drum and a fusing station where the toner image is fixed. With conventional physical rollers, the continuing possibility of dynamic distortions to the toner image, or even slight misalignments resulting in image degradation, must always be considered. Problems with image degradation are particularly acute with color images, which must register multiple overlays created by separate color toner/fuser processing cycles to create the color image.

However, previous attempts to use fluid transport in high speed material processing systems that require accurate positioning have not been very effective. The disadvantages of commonly available fluid transport systems that use air jet mechanisms for support is most apparent when flexible objects such as continuous rolls of paper, sheets of paper, extruded plastics, metallic foils, wires, or optical fibers are transported. In such systems, the flexure modes can result in complex object behavior. Unlike rigid objects, flexible objects are dynamically unstable when supported by air jets, with edge curl, flutter, or other undesirable dynamic movements continuously occurring during support and transport. Such undesirable movements of the flexible object can result in mispositioning, transport failure, or even damaging surface contact between the flexible object and an air jet conveyor.

Accordingly, the present invention provides a fluid transport apparatus and method for moving a flexible object that does not require physical contact. The present invention can effectively work with either continuous or discrete flexible objects moving through a materials processing system. The present invention is a fluid transport system for moving a flexible object that includes a conveyor configured to direct fluid flow against opposite sides of the flexible object. A sensor unit is used to sense motion state of flexible object, where motion state is defined to include position, orientation, curvature, speed, or other desired positional or velocity information. A motion analysis unit is connected to the sensor unit to calculate trajectory of the flexible object during transport based on its sensed motion state. Trajectory calculations can include determination of overall object position, velocity, and orientation information, as well as position, velocity, and orientation of subregions within the object (such as caused by flexure). To ensure for dynamic adjustments necessary for transport of the flexible object, a motion control unit is connected to the motion analysis unit, with the motion control unit configured to modify fluid flow directed against opposite sides of the flexible object to adjust motion state of flexible objects. This permits correction of object misalignments, incorrect speed or travel path, or object pitch, roll, and yaw (if three dimensional orientation information is available), and even unwanted flutter, buckling, or edge curling.

In a most preferred embodiment of the present invention, paper or other graphically markable material is among the flexible objects capable of being tracked in accordance with the present invention. A paper handling system includes a plurality of opposed air jets adjusted for transport of paper, with at least a portion of the plurality of air jets being individually controllable. A sensing unit continuously (or intermittently) determines paper position, and an air jet control unit connected to the sensing unit is configured to modify paper trajectory in response to information received from the sensing unit. In response to the calculated position, the air jet control unit modifies paper movement or orientation (for example, by selectively increasing or decreasing air flow from air jets that impart momentum to defined subregions of the paper) to nearly instantaneously correct for discrepancies in the motion state of the paper, including its position, orientation, trajectory, velocity, flexure, or curvature. In preferred embodiments, the plurality of opposed air jets can be used to apply tensile or compressive forces to flatten paper, and the air jet control unit can be used to maintain paper in this flattened position during transport. Of course, other paper positions (in addition to flat) can also be maintained, with, for example, the plurality of opposed air jets being used to generate sufficient force to curve selected subregions of the paper.

Additional functions, objects, advantages, and features of the present invention will become apparent from consideration of the following description and drawings of preferred embodiments.

DETAILED DESCRIPTION OF THE INVENTION

Figure 1:
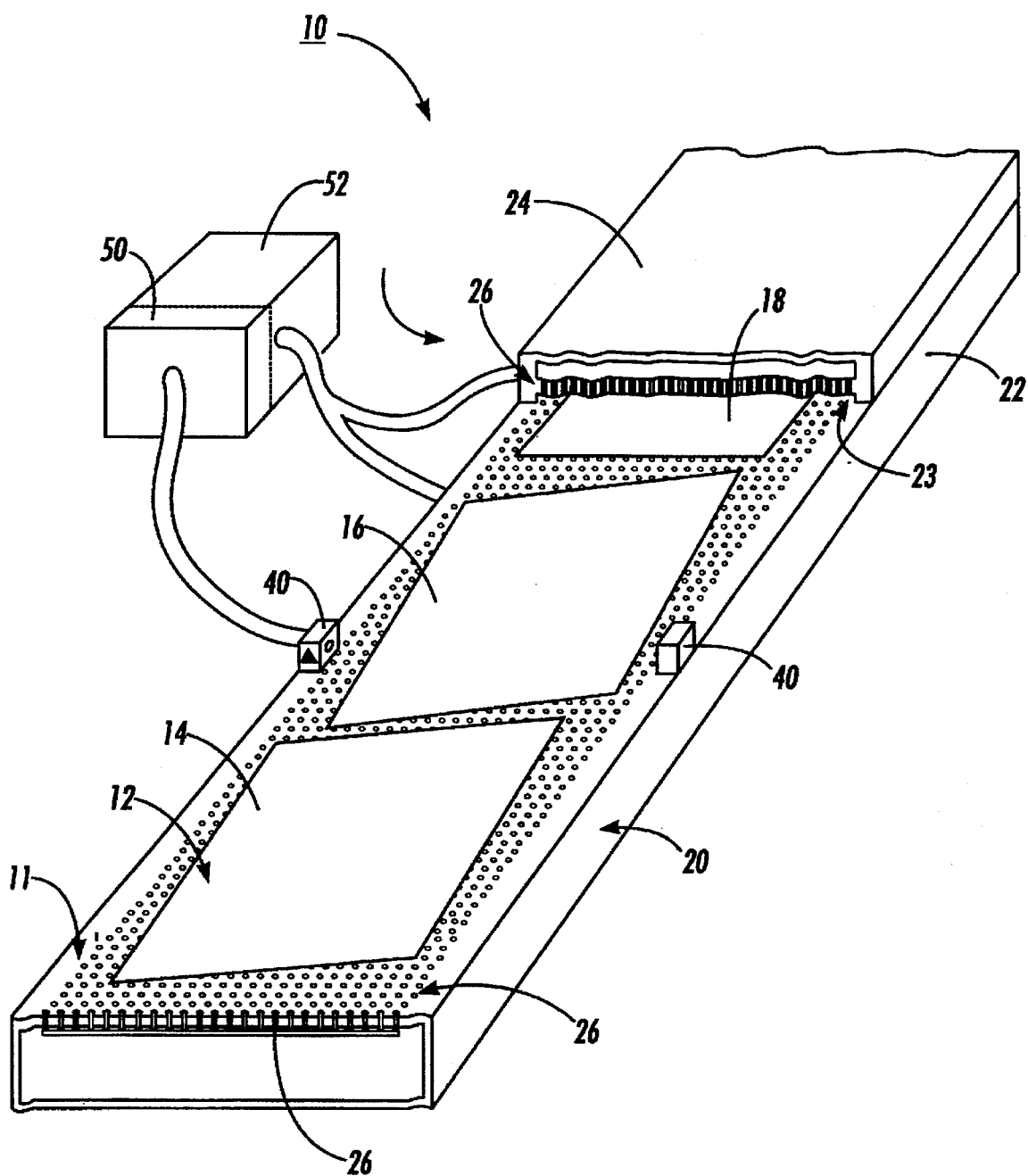
FIG. 1 illustrates a paper handling system for accurately moving air jet supported papers at high speeds, with sensor units used to detect a paper, and a movement control unit connected to the sensor units to provide appropriate corrective input to air jets to maintain the paper on a desired path, velocity, and orientation.

A processing system 10 optimized for handling objects without requiring direct physical contact, including sheets of paper 12, is partially illustrated in FIG. 1. The processing system 10 has a conveyor 20, divided into an lower section 22 and a upper section 24. For clarity, the upper section 24 is cut away to better illustrate paper movement, however, it will be appreciated that the upper section 24 and lower section 22 are substantially coextensive. The sections 22 and 24 are maintained in spaced apart relationship to define a passage 23 therebetween, with the passage sized to accommodate non-contacting passage therethrough of paper 12. Each section 22 and 24 has a plurality of independently or semi-independently controlled adjustable air jets 26 for dynamically supporting, moving, and guiding paper 12 through the system 10. Having opposed air jets in sections 22 and 24 permits adjustable application of air flow (by the directed air jets) to opposing sides of paper 12, dynamically holding the paper between sections 22 and 24, while allowing precise control of paper position, velocity, and orientation through application of vertical, lateral, or longitudinal forces (again by directed air jets). As an added advantage, the use of independent or semi-independent controlled adjustable air jets 26 allows for dynamically increasing or decreasing air flow directed against portions of paper 12, allowing straightening, flattening, curling, decurling, or other desired modification in paper topography, as well as adjustments to paper position, orientation and velocity. In addition, paper of various weights, sizes, and mechanical characteristics can be easily supported and accelerated by appropriate modification of the air flow applied by air jets 26. For example, a heavy, thick, and relatively inflexible cardboard type paper may require more air flow from the jets 26 for support and maneuvering, while a lightweight paper sheet may require less overall air flow, but may need quicker and more frequent air flow adjustments directed by the independent or semi-independent air jets 26 to compensate for flutter or edge curling effects.

Active flexible object guidance (of paper 12) to correct for flutter and other dynamic problems of flexible objects is enabled by provision of at least one sensing unit 40. The sensing unit 40 senses the motion state of paper 12, giving spatial and dynamic information (such as may be yielded from application of an optical imaging system or edge detection system) to a motion analysis unit 50 capable of calculating relative or absolute movement of paper 12 from the received information, with movement calculations generally providing overall position, orientation, velocity of paper 12, as well as position, orientation, and velocity of subregions of the paper 12 (due to flexure of the paper 12).

Typically, the motion analysis unit 50 is a general purpose computer or dedicated hardware system capable of high speed image processing calculations necessary for determining object movement. Using this calculated movement information, a motion control unit 52 connected to the motion analysis unit 50 sends control signals to conveyor 20 to appropriately modify movement of paper 12 by selectively increasing or decreasing application of directed air jets to subregions of the paper 12 to reduce flutter, buckling, curling, or other undesired deviations from the desired motion state. As will be appreciated, use of discrete sensors, motion analysis units, and motion control units is not required, with integrated motion analysis and motion control assemblies being contemplated. In fact, it is even possible to provide a plurality of integrated sensors, motion analysis units, and motion control units as integrated microcontroller assemblies on the conveyor.

Whether the sensing unit 40 is discrete or integrated with microcontrollers, in order to ascertain object position properly the sensing unit 40 must be reliable and accurate, having a spatial and temporal resolution sufficient for tracking a relatively small area of the flexible object (typically at least about one square centimeter, although greater or lesser resolution is of course possible). Further, in many processes the object is moving quickly, allowing less than a 100 milliseconds for tracking measurements. Fortunately, optical sensors, video imaging systems, infrared or optical edge detectors, or certain other conventional detectors are capable of providing suitable spatial and temporal resolutions. For best results, two dimensional optical sensors (such as charge coupled devices (CCD's)), scanned one dimensional arrays, or continuous position sensitive detectors are utilized. However, fixed one dimensional sensor arrays can also be used. As will also be appreciated, contactless sensors other than optical sensors may be used, including but not limited to pressure sensors, acoustic sensors, or electrostatic sensors.

In operation, use of a sensing unit 40 for feedback control of object movement allows for precise micromanipulation of object motion state. For an illustrative example, in FIG. 1 paper 12 is sequentially illustrated in three distinct positions along conveyor 20, respectively labeled as paper position 14, paper position 16, and paper position 18. In position 14, the paper 12 arriving at the conveyor 20 is misaligned. As paper 12 is moved along conveyor 20 toward position 16 by air jets 26, the sensor 40 provides a time series of discrete spatial measurements that correspond to the instantaneous position of paper 12. These elements of a time series of spatial measurement information are continuously passed to the motion analysis unit 50. The motion analysis unit 50 uses the received information (i.e. the sensor measured one, two, or three dimensional spatial information) to accurately determine motion state of paper 12, including its position, velocity, and dynamics. This information (which may be collectively termed "trajectory") is passed to the motion control unit 52, which computes a corrective response to minimize error in trajectory and sends signals to selected air jets 26 to correct the misalignment, bringing the paper 12 closer to alignment as indicated by position 16. This feedback control process for properly orienting paper 12 by feedback controlled corrections to paper trajectory (the paper 12 now spatially located at position 16) is repeated, with the trajectory of paper 12 finally being correctly aligned as shown at position 18. As will be appreciated, this feedback control process for modifying the trajectory of flexible objects can be quickly repeated, with millisecond cycle times feasible if fast sensor, motion processing, and air jet systems are employed.

Advantageously, the present invention allows for manipulation and control of a wide variety of flexible objects and processes. In addition to paper handling, other flexible articles of manufacture, including extruded plastics, metallic foils, wires, fabrics, or even optical fibers can be moved in accurate three dimensional alignment. As will be appreciated, modifications in layout of conveyor 20 are contemplated, including but not limited to use of curved conveyors (with curvature either in a process direction or perpendicular to the process direction to allow for vertical or horizontal "switchbacks" or turns), use of cylindrical or other non-linear conveyors, or even use of segmented conveyors separated by regions that do not support air jets. In addition, it may be possible to construct the conveyer 20 from flexible materials, from modular components, or as interlocking segmented portions to allow for quick and convenient layout of the conveyor in a desired materials processing path.

The present invention permits ready detection and correction of trajectory, rotations, slight misalignments, three dimensional misalignments due to flutter, creases, edge turning, or other orientation problems that can be difficult to quickly detect and provide suitable movement compensation using standard material processing movement control systems. As will be appreciated by those skilled in the art, proper air jet construction and control is a critical aspect of the present invention. Typically, air jets must be constructed and positioned with respect to a flexible object to enable application of on the order of one millinewton of force to each side of the flexible object, with precise force values of course depending on material and dynamic properties of the flexible object, along with the desired object acceleration and trajectory. For best operation, the exerted air jet forces must be quickly changeable. For example, a typical 0.025 cm diameter orifice having a length of about 0.1 centimeter would be expected to have an intrinsic response time for air movement on the order of 100 microseconds. Of course valve response times, controllers, motion analysis, and pressure conditions must also be such that air jet operation and control occurs on a millisecond time scale.

Figure 2:
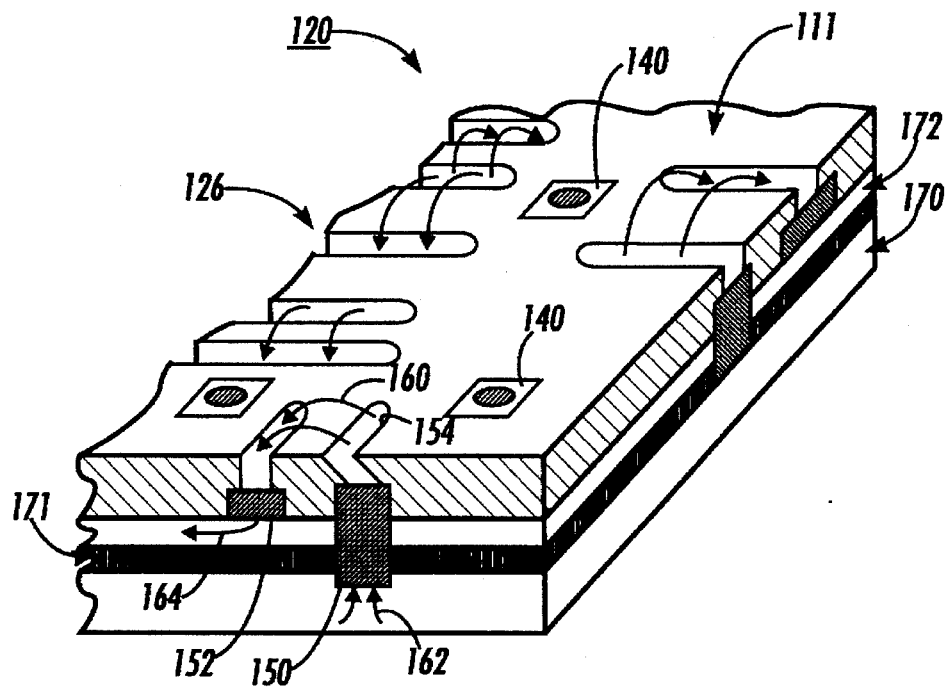
FIGS. 2 is an exemplary illustration of a directed air jet system having vertical, lateral, and longitudinal air jets, along with integrated sensor systems to enable accurate feedback controlled positioning of flexible objects in three dimensions.

A generic air jet architecture suitable for use in the present invention is illustrated with reference to FIG. 2. A portion of a flexible object conveyor 120 includes a variety of air jets 126 for enabling longitudinal, lateral, and vertical transport of flexible objects (flexible objects not shown for clarity). The air jets 126 include channels 154 defined in the conveyor surface 111 to allow exit or entrance of flowing air 160. For example, a valve 150 can be selectively operated to permit high pressure air in plenum 170 to flow upward, impart momentum to flexible objects, and pass downward through valve 152 and into plenum 172. As shown in FIG. 2, plenum 172 is separated from plenum 170 by partition 171, with plenum 172 being maintained at a lower air pressure than plenum 170.

Control of flexible object path is enabled by provision of a plurality of integrated sensors 140, which can include, but are not limited to, optical, mechanical, thermal, electrostatic, or acoustic sensors. The sensors 140 are used to provide near continuous sensor feedback relating to object position, which in turn allows nearly continuous movement control of flexible objects passing adjacent to the air jets 126. As will be appreciated, information received from sensors 140 can be passed to a centralized motion analysis unit and motion control unit, such as described in connection with FIG. 1. Alternatively, distributed or local motion analysis and control can be employed. For example, sensors 140 can be integrated with computer microcircuitry capable of analyzing sensor input and directing control of air jets.

Figure 3:
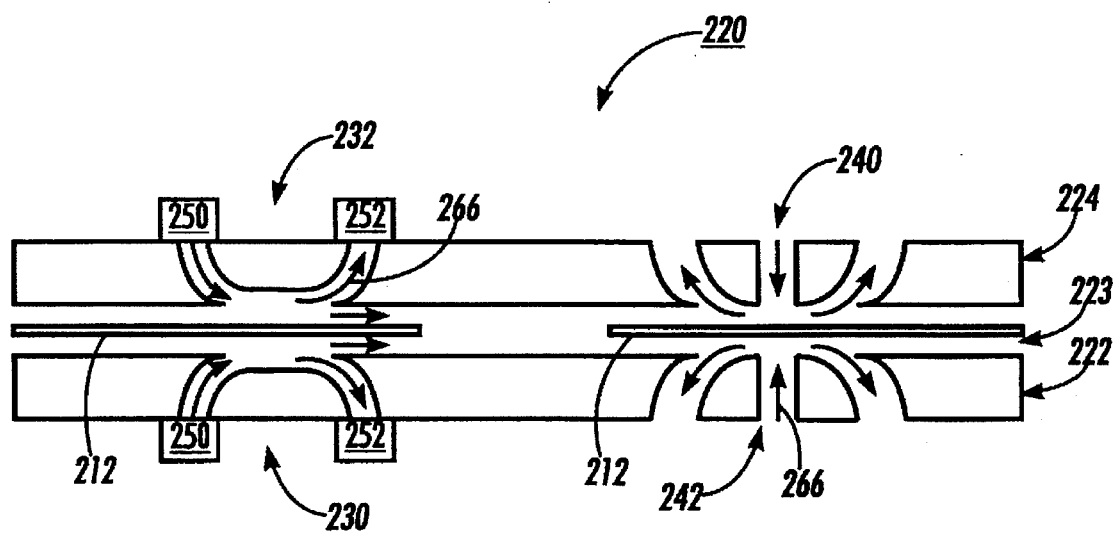
FIGS. 3 is a cross section of a directed air system similar to that illustrated in FIG. 2, illustrating directed air flow patterns.

FIG. 3 is a side view of a flexible object conveyor 220 that is divided into an lower section 222 and a upper section 224, with a passage 223 therebetween, and each section 222 and 224 having a plurality of independently or semi-independently controlled adjustable air jets 26 for dynamically supporting, moving, and guiding paper 12 through the system 10. As previously explained in connection with FIG. 1, having opposed air jets in sections 222 and 224 permits adjustable application of air flow (by the directed air jets) to opposing sides of paper 212, dynamically holding the paper between sections 222 and 224, while allowing precise control of paper position, velocity, and orientation through application of vertical, lateral, or longitudinal forces (again by directed air jets). For example, longitudinal transport of paper 212 is encouraged by the combined action of air jets 230 and 232, positioned to oppose each other in respective sections 222 and 224. Air flow 260 is controlled by valves 250 and 252, with the air flow imparting longitudinally directed momentum to paper 212. As another example of controlling position of paper 212, opposed air jets 240 and 242 can be used to vertically direct air 260 to suspend paper 212 in a desired position in conveyor 220.

Figure 4:
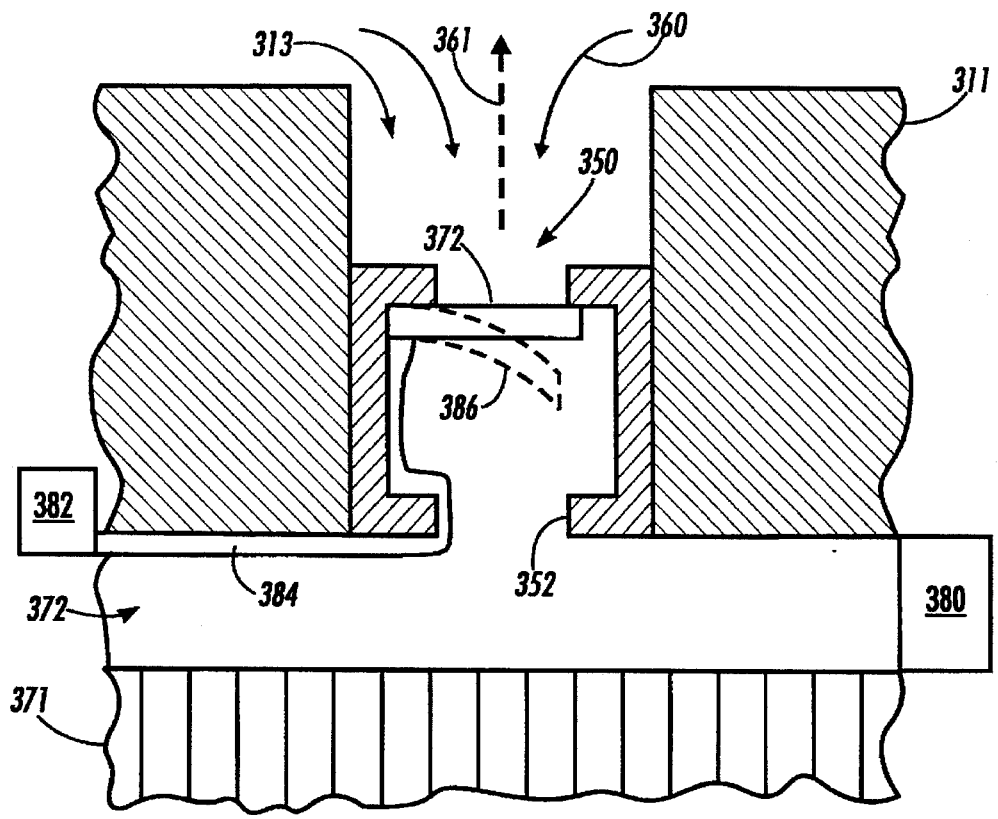
FIG. 4 illustrates an air jet controlled by piezo or electrostatically operated flap valve.

A particular embodiment of an air valve 350 capable of being employed in the present invention in conjunction with air jets such as seen in FIGS. 1–3 is illustrated in side view in FIG. 4. The air valve 350 is a piezoelectric flap valve, with motion electrically controlled by connection through leads 384 to valve controller 382. The valve 350 includes a housing 352 positioned in an aperture 313 of a conveyor surface 311, and a movable flap 386 (illustrated in closed position in solid lines, and open position by dotted lines). In operation, air movement can be either outward (e.g. dotted arrow 361) or inward (arrows 360), depending on pressure in plenum 372 (with plenum 372 being defined between conveyor surface 311 and partition 371). The pressure in plenum 372 can be modified or maintained by its connection to air pressure source 380. Air pressure source 380 can be a fan, vacuum source, pressurized air source, or any other conventional device suitable for modifying available air pressure in plenum 372.

As will be appreciated by those skilled in the art, the valve design illustrated in FIG. 4 is for illustrative purposes only, with many other suitable valve designs capable of being used in conjunction with the present invention. For example, piezoelectric, thermal bimorph, thermal volume change, fluid state change, acoustic pressure, or electrostatic microactuator valves can all be used. Air flow through valves can be individually controlled or controlled in groups. For best results, fast acting (millisecond or less) valve operation times are preferred, however with appropriate predictive movement controllers slower operating valves can be used.

Construction of valves for use in conjunction with the air jet architecture of FIGS. 2 and 3, or the architecture of other suitable air jets in accordance with the present invention, is possible with a variety of machining or micromachining techniques, including those associated with conventional integrated circuit fabrication. For example, chemical etching, electron beam lithography, photolithography, or other standard integrated circuit batch processing technologies can be used to define necessary air conduits, control or circuitry conduits, holes, orifices, and apertures, and even movable valves. Alternatively, injection molding, high precision numerically controlled machines, or stereolithography can be employed for valve construction. Materials used in construction may include plastics, metals, or ceramics. In one possible embodiment a semiconductor such as silicon may be coated with single or multiple layers of doped silicon, polysilicon, silicon nitride, silicon, silicon oxide, oxynitride, plastics or aluminum, or any other available material suitable for lithographic processing to define the necessary valve structures or conduits.

Figure 5:
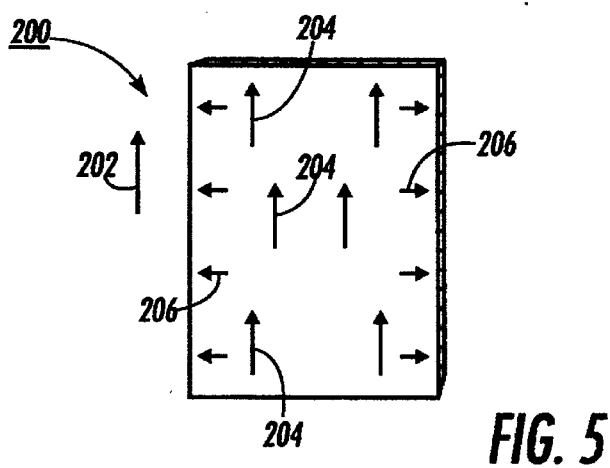
FIG. 5 schematically illustrates longitudinal transport forces and lateral tensioning forces applied by directed air jets to a sheet of paper.

One embodiment of the present invention illustrating possible control, transport, and orientation modes for directed application of force to a flexible object 200 (via air flow from directed air jets) is shown in FIG. 5. Applied transporting forces (indicated by arrows 204, with relative applied strength of forces indicated by arrow length) are directed against the flexible object 200 to longitudinally transport the flexible object 200 in a direction indicated by arrow 202. As will be appreciated, the indicated longitudinal force gradient also results in longitudinal tensioning forces on flexible object 200. In addition, lateral tensioning forces substantially perpendicular to the transporting forces are maintained on edges of the flexible object 200 as indicated by arrows 206. These combined longitudinal and lateral tensioning forces result in flattening of the flexible object 200. Of course, as those skilled in the art will appreciate, the strength and direction of the directed forces can be greatly modified, allowing, for example, directed tensile or compressive forces to curve object 200 about a longitudinal axis, a lateral axis, or even curving of selected subregions of an object (e.g. the corner of the object). This level of control would, for example, permit impressing curvature on a paper sheet about a longitudinal axis (parallel to the process direction) in order to enhance the paper stiffness.

Figure 6:
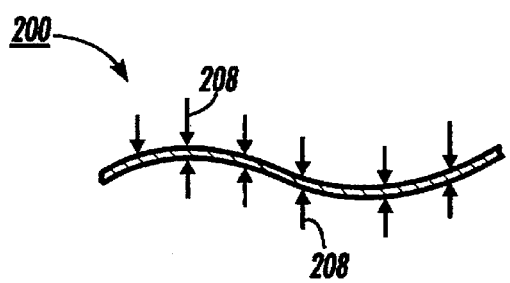
FIG. 6 is a side view of an air jet transported paper (vertical scale greatly exaggerated), with vertical force components used to eliminate transient flutter being illustrated.

FIG. 6 is a side view of object 200 (vertical scale greatly exaggerated), showing vertical components of force (indicated by arrows 208) used to minimize unwanted flutter or oscillations of the flexible object 200 orthogonal to the transport and tension direction as seen in FIG. 5. As will be appreciated, the force applied can be easily adjusted to correct for unwanted movement of the flexible object 200, or alternatively, can be used to force the flexible object 200 into a particular three dimensional orientation by selected application of varying amounts of force to particular subregions of the flexible object 200.

As will be appreciated, the amount and directionality of force directed against subregions of flexible object 200 (such as schematically illustrated in FIGS. 5 and 6) can be dynamically varied to allow for rotations, corrections in three dimensional orientation and position, or corrections in transport velocity. Typically, force applied to objects as indicated by arrows 204 or 206 is a complex integrated function of air flow duration, velocity, air volume, fluid friction coefficients, and other directional fluid transport properties that must by dynamically updated, controlled, or modified on a millisecond time scale for best results (for example, by use of appropriate controllable air flow valves such as previously discussed in conjunction with FIGS. 2 and 3).

While the present invention has been described in conjunction with specific embodiments thereof, it is evident that many alternatives, modifications, and variations will be apparent to those skilled in the art. Accordingly, the various embodiments described herein should be considered illustrative, and not limiting the scope of the present invention as defined in the following claims.

What is claimed is:

1. A fluid transport system for flattening and moving a flexible object having subregions, the system comprising a conveyor configured to direct fluid flow against opposite sides of the flexible object to flatten and move the flexible object, a sensor unit positioned to sense a motion state of the flexible object, including both overall and subregional movements of the flexible object;

a motion analysis unit connected to the sensor unit to determine motion state of the flexible object by calculating, said overall and subregional movements; and a motion control unit connected to the motion analysis unit, the motion control unit controlling fluid flow directed against opposite sides of the flexible object to modify selectively motion state of the flexible object by differentially imparting momentum to selected subregions of the flexible object to flatten and move the flexible object.

2. The fluid transport system of claim 1, wherein the motion control unit comprises a plurality of independently operated air jets for selectively directing air flows to impart momentum to selective subregions of the flexible object.

3. The fluid transport system of claim 2, wherein the plurality of independently operated air jets further comprises a plurality of independently controlled air valves.

4. The fluid transport system of claim 1, wherein the sensor unit comprises a plurality of sensors distributed along the conveyor.

5. The fluid transport system of claim 1, wherein the conveyor further comprises a lower section and an upper section positioned in spaced apart relationship to define a passage therebetween, with a plurality of independently controllable air jets positioned in the lower section and the upper section to provide three dimensional vertical, lateral, and longitudinal control of the motion state of the flexible object.

6. A fluid transport system for curving selectively and moving a flexible object having subregions, the system comprising a conveyor configured to direct fluid flow against opposite sides of the flexible object to curve selectively and move the flexible object, a sensor unit positioned to sense a motion state of the flexible object including both overall and subregional movements of the flexible object;

a motion analysis unit connected to the sensor unit to determine motion state of the flexible object by calculating said overall and subregional movements, and a motion control unit connected to the motion analysis unit, the motion control unit controlling fluid flow directed against opposite sides of the flexible object to modify selectively motion state of the flexible object by differentially imparting momentum to selected subregions of the flexible object to curve and move the flexible object.

\* \* \* \* \*